(12) United States Patent
Mildner (10) Patent No.: US 8,910,991 B2
(45) Date of Patent: Dec. 16, 2014

(54) DEVICE FOR FASTENING A COMPRESSIBLE AREAL STRUCTURE TO A BODY PART OF A VEHICLE

(71) Applicant: GM Global Technology Operations LLC, Detroit, MI (US)

(72) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/780,792

(22) Filed: Feb. 28, 2013

(65) Prior Publication Data

US 2013/0276272 A1    Oct. 24, 2013

(30) Foreign Application Priority Data

Apr. 20, 2012    (DE) .......................... 10 2012 007 973

(51) Int. Cl.
| | |
|---|---|
| *B60K 37/02* | (2006.01) |
| *B60R 13/02* | (2006.01) |
| *F16B 5/06* | (2006.01) |
| *F16B 5/12* | (2006.01) |
| *F16B 21/02* | (2006.01) |

(52) U.S. Cl.
CPC ............... *F16B 5/12* (2013.01); *B60R 13/0256* (2013.01); *B60R 13/0206* (2013.01); *F16B 5/0642* (2013.01); *F16B 21/02* (2013.01)
USPC .......................................................... 296/72

(58) Field of Classification Search
CPC ...... B62D 25/081; B62D 25/04; B62D 25/08; B60J 1/006; B60R 21/34; B60K 20/04
USPC ................................ 296/96.21, 39.1, 189, 72
See application file for complete search history.

(56) References Cited

U.S. PATENT DOCUMENTS

| | | |
|---|---|---|
| 3,153,468 A | 10/1964 | Sweeney |
| 5,362,102 A | 11/1994 | Hajek et al. |
| 5,934,729 A | 8/1999 | Baack |
| 6,145,908 A | 11/2000 | Deb et al. |

(Continued)

FOREIGN PATENT DOCUMENTS

| | | |
|---|---|---|
| DE | 102004030689 A1 | 1/2006 |
| EP | 1719670 A1 | 11/2006 |
| FR | 2852901 A1 | 10/2004 |
| FR | 2876166 A1 | 4/2006 |
| GB | 676981 | 8/1952 |

(Continued)

*Primary Examiner* — Joseph D Pape
*Assistant Examiner* — Dana Ivey
(74) *Attorney, Agent, or Firm* — Ingrassia Fisher & Lorenz, P.C.

(57) ABSTRACT

The invention relates to a device for fastening a compressible areal structure to a body part of a vehicle having at least one connecting element and at least one counterpart element, which subject to fixing a compressible areal structure to a body part can be connected to each other. It is provided that the counterpart element comprises a mounting, into which the connecting element for connecting to the counterpart element can be inserted, wherein the mounting allows a movement of the connecting element relative to the counterpart element subject to maintaining the fixing of areal structure and body part. The invention furthermore relates to an arrangement of body part, compressible areal structure and at least one device for fastening the areal structure to the body part. The body part can be a window support, in particular for the windshield of a vehicle, and the areal structure can be a sound/and a heat-insulating structure.

15 Claims, 6 Drawing Sheets

(56) References Cited

U.S. PATENT DOCUMENTS

| | | | |
|---|---|---|---|
| 7,540,557 B2 * | 6/2009 | Shimura | 296/192 |
| 7,547,601 B2 | 6/2009 | Wang | |
| 2008/0238129 A1 * | 10/2008 | Billmaier et al. | 296/72 |

FOREIGN PATENT DOCUMENTS

| | | |
|---|---|---|
| GB | 2479436 A | 10/2011 |
| JP | 2006105366 A | 4/2006 |
| JP | 2006168405 A | 6/2006 |

* cited by examiner

DEVICE FOR FASTENING A COMPRESSIBLE AREAL STRUCTURE TO A BODY PART OF A VEHICLE

CROSS-REFERENCE TO RELATED APPLICATION

This application claims priority to German Patent Application No. 10 2012 007 973.7, filed Apr. 20, 2012, which is incorporated herein by reference in its entirety.

TECHNICAL FIELD

The technical field relates to a device for fastening a compressible areal structure to a body part of a vehicle with at least one connecting element and at least one counterpart element, which can be connected to one another subject to fixing a compressible areal structure on a body part.

BACKGROUND

Such a device is utilized for example in order to fasten a front wall insulation to the window support for the windshield of a motor vehicle. Usually, the device comprises one or a plurality of welding bolts, which are welded to the window support and stand away to the outside. The front wall insulation is put over the welding bolts and placed against the window support. In order to prevent the front wall insulation from coming loose from the window support, a holding element is supplied on the end of the welding bolts projecting from the front wall insulation.

The front wall insulation is usually formed through a heat and sound-insulating material, which is compressible. This results in that in the case of a collision of the motor vehicle with a pedestrian, cyclist or motor cyclist and the person crashing through the windshield and hitting the window support, the front wall insulation is compressed through the impact. As a result, the rigid welding bolts freely project towards the outside with respect to the compressed front wall insulation over a relatively large length and thus interfere with respect to the impacting person.

Accordingly, it is desirable to provide a device for fastening a compressible areal structure to a body part of a motor vehicle with the features mentioned at the outset, from the parts of which a person is protected when the person strikes the areal structure and the areal structure is compressed because of this. In addition, other objects, desirable features and characteristics will become apparent from the subsequent summary and detailed description, and the appended claims, taken in conjunction with the accompanying drawings and this background.

SUMMARY

In accordance with an exemplary embodiment, a device for fastening a compressible areal structure to a body part of a vehicle, in particular vehicle, such as for example a passenger car, has at least one connecting element and at least one counterpart element, which can be connected to one another subject to fixing a compressible areal structure to a body part of a vehicle. The body part can be a sheet metal part or other body part, for example a support part. The body part can also be a body attachment part.

According to an embodiment, the counterpart element comprises a mounting in which the connecting element is inserted, for example, is inserted for connecting to the counterpart element, wherein the mounting allows a movement of the connecting element relative to the counterpart element subject to maintaining the fixing of areal structure and body part.

Through this measure, interfering effects through individual components of the device are effectively avoided during an impact of persons on the compressible areal structure and a compression of the areal structure caused thereby, since a shifting of the connecting element against the counterpart element takes place. Upon a force acting on the compressible areal structure the connecting element thus participates in the movement which is caused through the compression of the areal structure, so that a dangerous projection of the connecting element from the compressed areal structure in the event of an impact is avoided. At the same time, the fixing of the areal structure to the body part is maintained by the device upon a compression of the areal structure and thus a movement of the connecting element relative to the counterpart element.

In an embodiment, the mounting permits a movement of the connecting element relative to the counterpart element in thickness direction of the areal structure subject to maintaining the fixing of areal structure and body part. Because of this, the person striking the body part is particularly effectively protected in the event of a crash of the motor vehicle since the movement of the connecting element specifically takes place in compression direction of the areal structure.

As used herein, thickness direction is to mean that direction which substantially extends orthogonally to the plane formed by the surface of the areal element.

In an embodiment, the mounting permits a movement of the connecting element relative to the counterpart element in insertion direction of the connecting element in the mounting subject to maintaining the fixing of areal structure and body part. Because of this, the device contemplated herein can b realized in a technically simple manner.

According to an embodiment, the counterpart element comprises a holder for connecting to the body part, through which in the installed state of the holder the mounting stands away to the outside in insertion direction. Through the holder arranged or formed on the counterpart element in this way, a possibility is realized in a technically simple manner that the case of a force being exerted on the areal structure, such as occurs for example upon a collision of the motor vehicle with a pedestrian or cyclist, the connecting element during the course of the compression of the areal structure carries out an evasive movement. To this end, the connecting element continues to move in the direction towards the end of the mounting standing away to the outside.

According to a further embodiment, limitation means are provided through which the movement of the connecting element in the mounting is limited. Because of this, the connecting element can be moved relative to the counterpart element over a predetermined range. Through the limitation means the device can be individually adjusted to local conditions in that depending on requirement the predetermined movement range of the connecting element is adapted relative to the counterpart element through the limitation means.

In another embodiment, the movement range of the connecting element relative to the counterpart element is predetermined even through the production of the device contemplated herein. In principle it is also possible that through the limitation means the movement range of the connecting element relative to the counterpart element can be adjusted even after the production.

According to a further embodiment, securing means are provided, through which the connecting element and the counterpart element are secured in the state in which they are connected to each other to prevent unintentional disconnection. Because of this it is ensured that in the installed state of the device contemplated herein, in which the connecting element is connected to the counterpart element and because of this the areal structure is held on the body part in a fixed manner, the connecting element cannot be separated from the counterpart element, i.e. a pulling-out of the connecting element from the mounting of the counterpart element does not take place.

According to an embodiment, the mounting is formed through a substantially cylindrical hollow space of a basic body, which at one end is at least partially closed by a bottom. The mounting is realized in a technically simple manner because of this. Because of the bottom, the mounting is largely protected from undesirable mechanical influences from outside so that the moving-in of the connecting element into the mounting is maintained even when the device is quite old.

According to a further embodiment, the basic body comprises a free-standing oblong material portion originating from the bottom, which projects into the hollow space and has a bulge at its free end which serves as abutment for positive connection means of the connecting element. Because of this, together with the positive connection means of the connecting element, securing means are formed in a technically simple manner through which connecting element and counterpart element are secured against unintentional disconnection in the state connected to each other.

Because of the fact that the oblong material portion is arranged in the hollow space of the basic body, the material portion with its bulge is protected from unintentional mechanical effects from the outside, so that the mode of action of the material portion with its bulge as abutment for the positive connection means is durably ensured.

It is practical that in the state of connecting element and counterpart element in which these are connected to each other the positive connection means of the connecting element at least partially engages about the material portion so that the positive connection means with respect to the material portion is held moveable in the direction of its longitudinal axis in order to maintain the movement of the connecting element relative to the counterpart element. Because of this, limitation means are realized in a technically simple manner through which the movement of the connecting element in the mounting is limited. Here, the bottom of the basic body against which the connecting element can be moved in the one direction serves as limitation. The bulge at the free end of the oblong material portion, against which the connecting element with its positive connection means can be moved in the other direction subject to maintaining the fixing action with respect to the areal structure and the body part without the connecting element being disconnected from the counterpart element, serves as further limitation, In an embodiment, the free standing oblong material portion with its longitudinal axis is located in the center of the hollow space. Because of this symmetrical arrangement, the counterpart element with its mounting and the connecting element corresponding thereto can be realized in a technically simple manner.

According to a further embodiment, seen in circumferential direction of the oblong material portion, the bulge is interrupted subject to forming at least two intermediate spaces, into which the positive connection means of the connecting element can be inserted so that by twisting the connecting element relative to the counterpart element the positive connection means and the bulge become engaged in one another in axial direction. Because of this, the connecting element can be positively connected to the counterpart element acting in axial direction in a technically simple manner so that the movability of the connecting element relative to the counterpart element is achieved and maintained subject to maintaining the fixing effect with respect to the areal structure on the body part.

According to another embodiment, the connecting element has a cylindrical, for example, hollow-cylindrical, insertion portion, which can be inserted into the hollow space of the basic body and preferentially comprises a bearing portion for bearing against the areal structure. Because of this, the connecting element assumes a holding effect with respect to the areal structure in a technically simple manner, wherein at the same time the connecting element is formed in a fitting manner in order to correspond to the hollow space of the basic body and thus be movably held in the mounting.

On the connecting element, the positive connection means can be formed in a technically simple manner through at least two material portions acting in a spring-elastic manner at least over a portion, which are formed on the connecting element, in particular molded on. The spring-elastic material portions can for example be formed in the manner of at least one clip element and/or engagement element, which can be positively brought into active position on the abutment of the counterpart element.

Material portions can for example be arranged on the front end region, in particular front end of the hollow-cylindrical insertion portion of the connection element, which protrude over the insertion portion towards the front. Because of this, the connecting element is formed in a compact manner in radial direction despite the positive connection means, since the positive connection means substantially extend in axial direction. The forming of the positive connection means in axial direction is another possibility of being able to movably hold the connecting element on the counterpart element in axial direction at the same time, which can be realized in a technically simple manner.

According to a further embodiment, an anti-rotation device is provided, through which the connecting element and the counterpart element in the state connected to each other are held in a rotationally fixed manner relative to each other. Because of this it is ensured that the connecting element remains in a predetermined position of rotation relative to the counterpart element when the connecting element and the counterpart element are connected to each other.

In an embodiment, the anti-rotation device is formed in such a manner that the connecting element assumes an anti-rotation position relative to the counterpart element only when the connecting element with its positive connection means is brought into active position on the free standing oblong material portion of the counterpart element. Because of this it is ensured despite the anti-rotation device that the connecting element and the counterpart element can be connected to each other in a predetermined position of rotation and only by rotating relative to each other over a predetermined angle the connecting element positively enters into an active connection relative to the counterpart element in axial direction.

According to an embodiment, the anti-rotation device can be formed in a technically simple manner through a depression in the rim of the mounting extending in axial direction, in which the connecting element enters into active contact with at least one protrusion when being inserted into the mounting.

In order to be able to bring the connecting element to be connected to the counterpart as desired in a simple manner, an opening or depression, for example a square, hexagonal, or other multi-sided opening or depression or a slot-like opening or depression is provided, according to an embodiment, on the outside of the bearing portion of the connecting element, which serves for starting or receiving a tool. Because of this, the connecting element for example can be brought into a predetermined position relative to the counterpart element, so that because of this the assembly of the connecting element to the counterpart element is facilitated.

Furthermore, according to a further embodiment, visual and/or tactile tools such as for example markings or marking arrows can be provided on the outside of the bearing portion, which provide information regarding the movement direction of the connecting element relative to the counterpart element for installation and/or for fastening.

According to a further embodiment, a plurality of protrusions standing away to the outside, in particular cone tips, also are arranged on the inside of the bearing portion facing the areal structure. Because of this, a positive connection of the bearing portion with the areal structure is effectively formed, so that through the bearing portion the areal structure is held in an optimal manner.

Furthermore, in an embodiment an arrangement of body part, compressible areal structure and at least one device of the type described above, by means of which the areal structure is fastened to the body part, is provided.

In another embodiment, the connecting element of the device, engaging through the areal structure, is connected to the counterpart element of the device, wherein the counterpart element is fastened to the body part and the mounting of the counterpart element stands away from the body part to the outside. Because of this, the connecting element can dip into the mounting of the counterpart element when for example in the case of a collision of the vehicle with a pedestrian or cyclist the areal structure is compressed. Through the movement of the connecting element, the deceleration on the pedestrian or the head of the pedestrian or cyclist is reduced and thus a measure for the protection of the person realized.

The body part can for example be a window support, in particular a window support for the windshield of a vehicle. The body part can be a hybrid component preferentially produced in hybrid design.

The compressible areal structure can be a sound and/or heat insulating structure, for example a front wall insulation, which is applied for example to the window support for the windshield of the vehicle.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
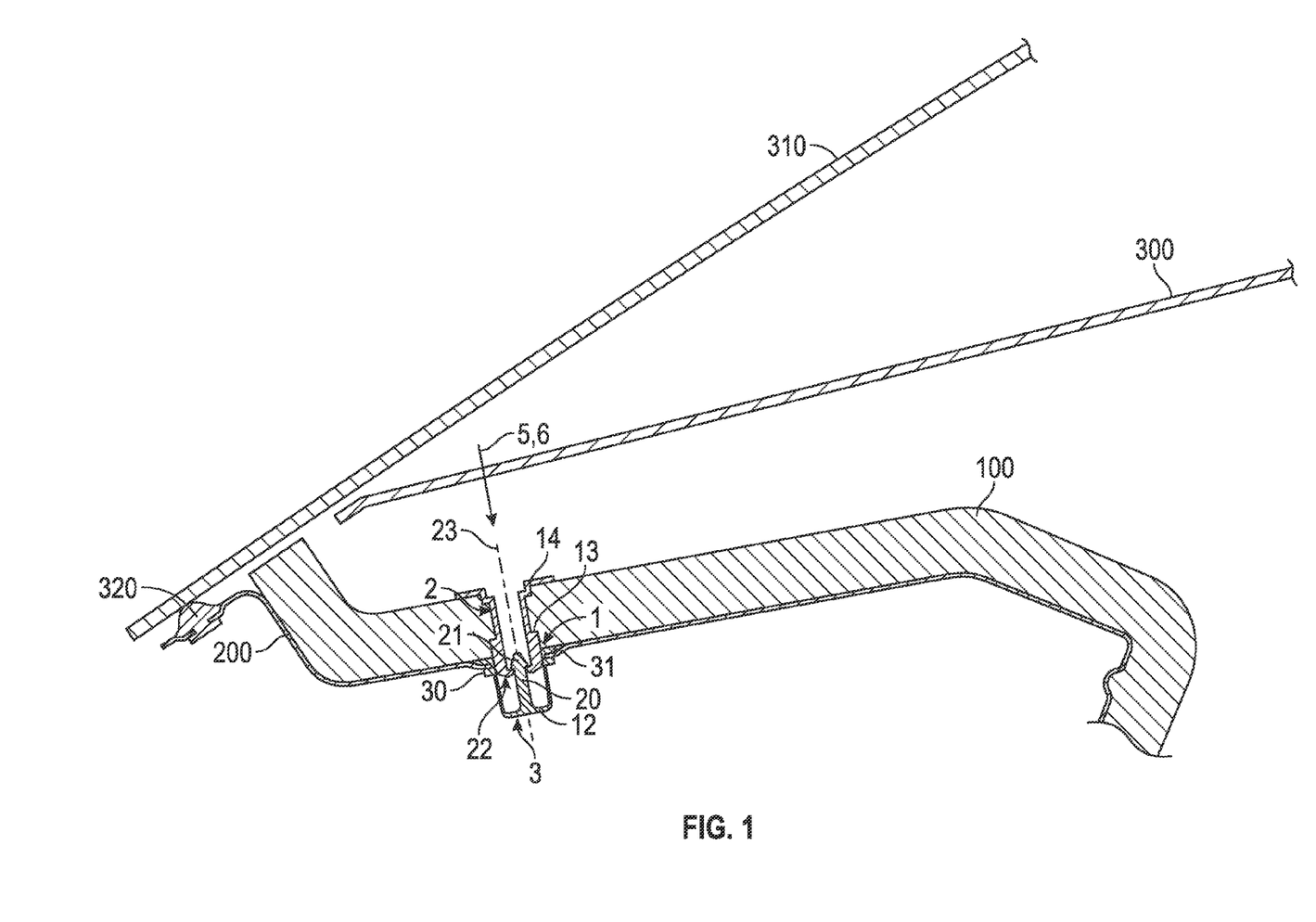
FIG. 1 is a sectional perspective view of a device for fastening a compressible areal structure to a body part of a vehicle, particularly, the fastening of a front wall insulation to a window support for the windshield of a motor vehicle in accordance with an exemplary embodiment.

FIG. 1 shows—in schematic representation—an embodiment of a device 1 for fastening a compressible areal structure to a body part of a vehicle. In the exemplary embodiment of FIG. 1, the device serves for fixing a compressible areal structure 100 of the type of a front wall insulation to a body part 200 of the type of a window support for the windshield 310 of a motor vehicle. As is evident from FIG. 1, the instrument panel 300 of the motor vehicle is located between the windshield 310 and the body part 200 formed as window support. The body part 200 or the window support is spaced from the windshield 310 by at least one for example a plurality of spacer pieces 320. The spacer pieces 320, in an embodiment, are formed of an elastic material such as for example rubber or plastic.

In the exemplary embodiment of FIG. 1, the windshield 310 extends far into the front region of the motor vehicle, as a result of which the window support 200 substantially comes to lie in a horizontal position. The windshield 310 and the window support 200 are thus positioned at a relatively acute angle to each other. When, with such an arrangement of windshield 310 and window support 200, a collision of the motor vehicle with a pedestrian, cyclist or motor cyclist occurs, it must be expected that the person or the head of the person will strike the windshield 310 and penetrate as far as the areal structure 100 and the body part 200 or window support located below. In the process, a compression of the areal structure 100 in its thickness direction 5 occurs. The device 1, by means of which the areal structure 100 is fastened to the body part 200 or to the window support is formed in a particular manner in order to avoid that the impacting person injures herself on the individual parts of the device 1.

To this end, the device 1 comprises a connecting element 2 and a counterpart element 3, which are releasably connected to each other subject to fixing the areal structure 100 to the body part 200. The counterpart element 3 to this end comprises a mounting 4, into which the connecting element 2 is inserted for connecting to the counterpart element 3. The mounting 4 in this case is formed in the manner that it permits a movement of the connecting element 2 relative to the counterpart element 3 subject to maintaining the fixing of areal structure 100 and body part 200. Through the movability of the connecting element 2 relative to the counterpart element 3, the connecting element 2 carries out a movement in the direction of the counterpart element 3 when a compression of the front wall insulation or areal structure 100 occurs during the course of a person crashing through the windshield 310 and thus an impact on the areal structure 100 in the region of the device 1. To this end, the connecting element 2 preferably moves in thickness direction 5 of the areal structure 100, in which the compression of the areal structure 100 takes place. As is evident from FIG. 1, the thickness direction 5 in the present embodiment of the device 1 corresponds to the insertion direction 6 of the connecting element 2 in the mounting 4 of the counterpart element 3.

In order to make possible such a movement of the connecting element 2 relative to the counterpart element 3, the counterpart element 3 comprises a holder 30 for connecting to the body part 200, through which the mounting 4 in the installed state according to FIG. 1 stands away from the body part 200 in insertion direction 6 towards the outside.

To this end, a through-opening 31 is preferably provided in the body part 200, on the rim of which the holder 30 of the counterpart element 3 be or is actively connected to the body part 200 in a positively joined manner. The movement of the connecting element 2 thus takes place in the mounting 4 passing through the body part 200.

Figure 2:
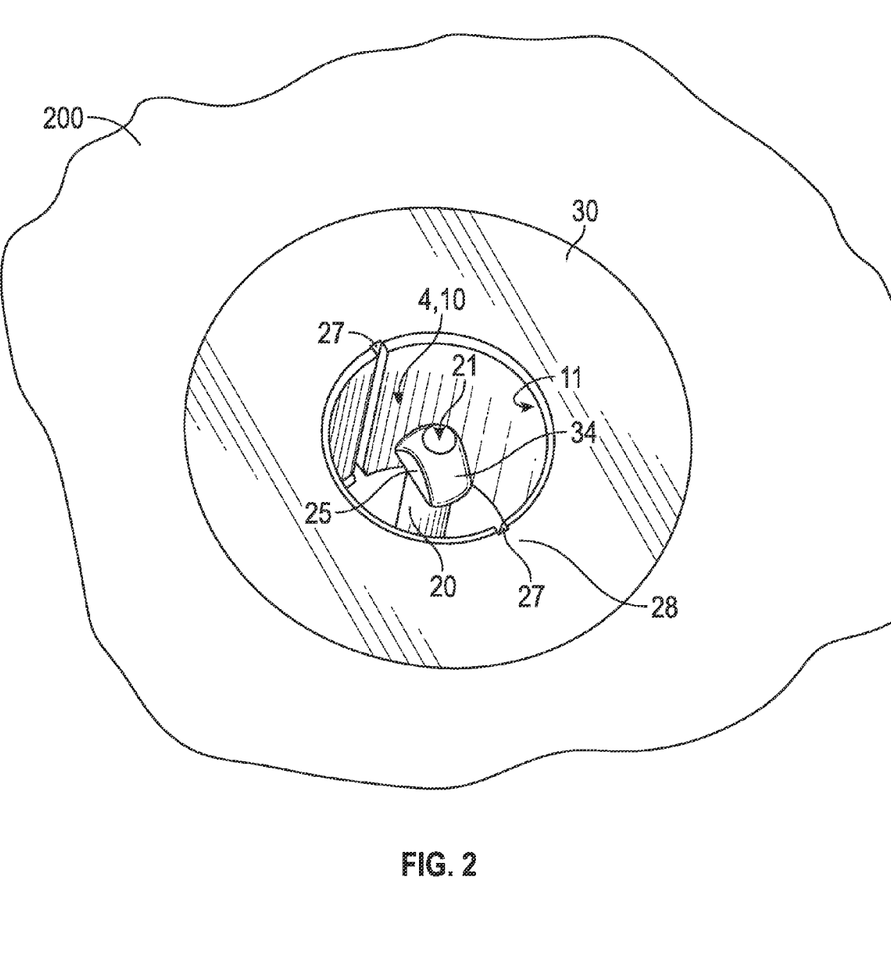
FIG. 2 is a perspective view of a component of the device assigned to the window support according to FIG. 1.

FIG. 2 together with FIG. 1 illustrates the construction of the counterpart element 3. As is evident from these, the mounting 4 is formed through a substantially cylindrical hollow space 10 of a basic body 11, which on its end facing away from the areal structure 100 is at least partially closed off by a bottom 12. In an embodiment, the basic body 11 is formed cylindrically, in particular as a cylindrical pocket.

On the bottom 12 of the basic body 11, a free-standing oblong material portion 20 is molded on, which is for example formed cylindrically. The material portion 20 projects into the hollow space 10 and has a bulge 21 at its free end. In an embodiment, with its longitudinal axis 23, the material portion 20 preferably lies in the center of the hollow space 10 and extends along the center axis of the hollow space and starting out from the bottom 12 faces against the insertion direction 6. The material portion 20 and the bulge 21 can for example have the shape of a pen element with a mushroom-like end.

The bulge 21 serves as abutment for positive connection means 22 of the connecting element 2, such as is evident for example from FIG. 1. The configuration of the positive connection means 22 of the connecting element 2 will be discussed in more detail in the following.

The counterpart element 3 furthermore comprises two depressions 27 extending in insertion direction 6 in the rim 28 of the mounting 4, in order to receive therein corresponding projections of the connecting element 2 for forming an anti-rotation device. The depressions 27 are each formed for example through an axially running notch in the basic body 11.

Figure 3:
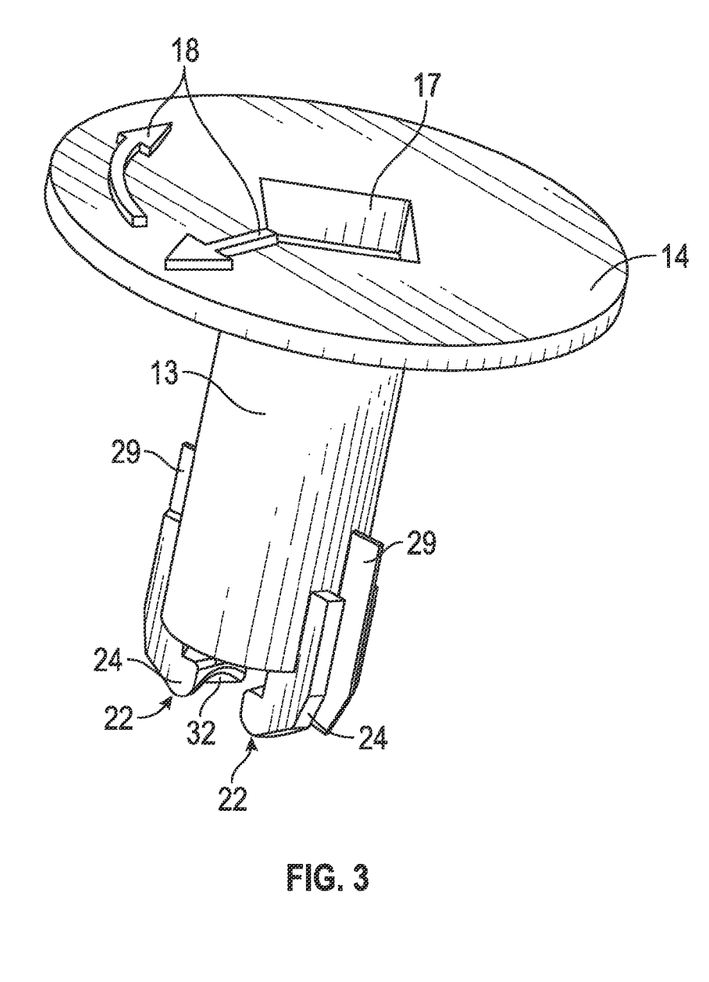
FIG. 3 is a perspective view from above of a component of the device assigned to the front wall insulation according to FIG. 1.
Figure 4:
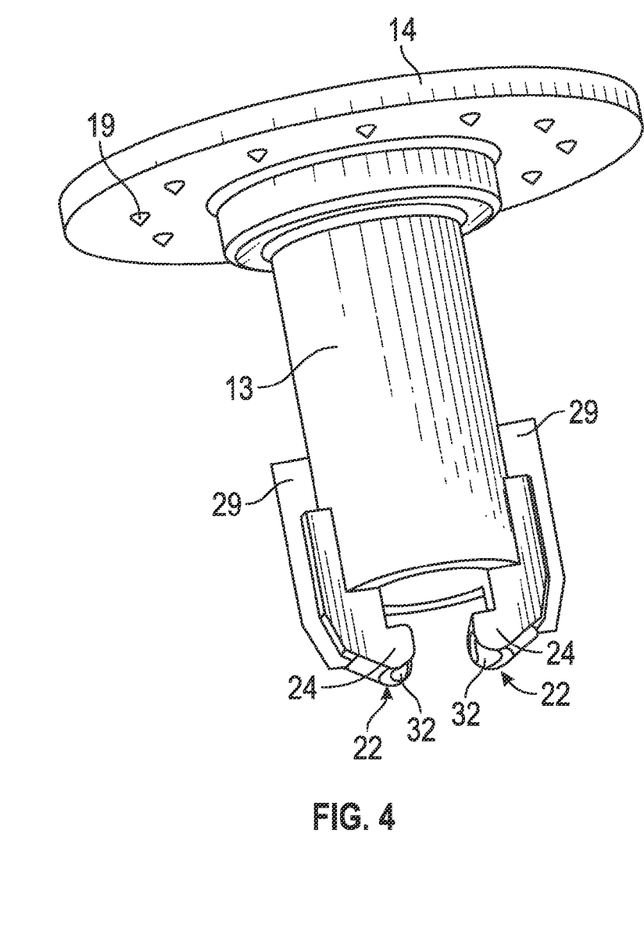
FIG. 4 is a perspective view from below of the component of the device according to FIG. 3.

FIGS. 3 and 4 illustrate the connecting element 2 shown in the sectional representation of FIG. 1.

As is evident from this, the connecting element 2 comprises a preferentially cylindrical, for example, hollow-cylindrical insertion portion 13, which can be inserted into the hollow space 10 of the counterpart element 3. Furthermore, the connecting element 2 comprises a bearing portion 14 for bearing against the areal structure 100. The bearing portion 14 is for example embodied disc-like, for example in the manner of a cylindrical disc.

On the free end of the insertion portion 13, the positive connection means 22 are arranged, in particular formed, by means of which in the state connected to each other, connecting element 2 and counterpart element 3 assume an active position relative to the bulge 21 of the counterpart element 3 in order to form a safeguard against unintentional disconnecting of the connecting element 2 from the counterpart element 3. The positive connection means 22 of the connecting element 2 and the bulge 21 of the counterpart element 3 thus form safeguards for the securing device.

In an embodiment, the positive connection means 22 are formed through two material portions 24, which are formed laterally standing away to the outside from the circumferential surface of the insertion portion 13 and extend forward protruding over the free end of the insertion portion 13. The material portions 24 are preferably arranged diametrically located opposite each other and extend towards each other in the region protruding over the insertion portion 13 towards the front. The material portions 24 are for example free-standing in the front portion extending towards each other in such a manner that they are slightly movable relative to each other in radial direction with respect to the insertion portion 14, for example formed spring-elastically in order to be able to be pushed over the bulge 21 of the counterpart element 3 when the counterpart element 3 is inserted into the mounting 4. The bulge 21 of the counterpart element to this end is formed for example conically, wherein the outer wall meets towards the outside. In addition, the material portions 24 preferably comprise a lead-in slope 32 each at their front region extending in the direction of the longitudinal axis 23, by means of which the sliding-on of the material portions 20 over the conical outer surface 34 of the bulge 22 is facilitated.

The material portions 24 thus form engagement or clip-on means, which against the bulge 24 of the counterpart element 3 acting as abutment form a positive connection acting in axial direction with respect to the longitudinal axis 23.

On the insertion portion 13 of the connecting element 2, two protrusions 29 are furthermore provided, which for example are arranged located diametrically opposite each other and stand away from the outer circumference of the insertion portion 13 to the outside. The protrusions 29 preferentially extend over a predetermined portion in axial direction with respect to the longitudinal axis 23.

The protrusions 29 are formed corresponding to the depressions 27 of the counterpart element 3, so that in the state of connecting element 2 and counterpart element 3 in which these are connected to each other, the protrusions 29 assume an active position relative to the depressions 27 and form an anti-rotation device in order to hold the connecting element 2 rotationally fixed relative to the counterpart element 3.

As is evident when viewing the FIGS. 3 and 4 together with FIG. 2, the positive connection means 22 of the connecting element 2 and the bulge 21 of the counterpart element 3 are formed in such a manner that despite the bulge 22 and the positive connection means 22, inserting of the connecting element 2 in the hollow space 10 of the counterpart element 3 is made possible and the positive connection means 22 and the bulge 21 engage each other in axial direction only when the connecting element 2 relative to the counterpart element 3 is twisted over a predetermined twisting angle. To this end, the bulge 21 comprises at least two interruptions in the circumferential profile through which intermediate spaces 25 are formed. To this end, the bulge 21 is preferentially flattened on two sides in the circumferential profile located opposite each other in such a manner that the distance of the surfaces flattened relative to each other substantially corresponds to the diameter of the material portion 20. The positive connection means 22 with their material portions 24 are formed in such a manner that when inserting the connecting element 2 into the hollow space 10 of the counterpart element 3 the material portions 24 can be moved along these side walls in axial direction with respect to the longitudinal axis 23. Because of this, inserting of the connecting element 2 into the hollow space 10 of the counterpart element 3 is possible without the positive connection acting in axial direction. Only when the positive connection means 22 have assumed the active position relative to the bulge 21 and the positive connection acting in axial direction has thus been established, will the connecting element 2 find itself in the predetermined position relative to the counterpart element 3 in which the device 1 becomes fully effective, namely that the connecting element 2 can carry out a movement in axial direction relative to the counterpart element 3.

In this twisting position of the connecting element 2 relative to the counterpart element 3, the depressions 27 of the counterpart element 3 and the protrusions 29 of the connecting element 2 are aligned with one another so that the protrusions 29 can be inserted into the corresponding depressions 24 and the anti-rotation device being thus formed.

At its bearing portion 14, on its side 15 facing towards the outside, the connecting element 2 comprises visual and/or tactile tools 18, which provide the assembler with information regarding the movement of the connecting element 2 relative to the counterpart element 3 when assembling the device 1. The tools 18 can for example be formed in the manner of marking arrows.

As is evident, in particular, from FIG. 3, the bearing portion 14 furthermore comprises an opening 17, on which tools can be inserted in order to be able to move the connecting element 2 relative to the counterpart element 3 during the course of the assembly of the device 1. The opening 17 for example is formed as square or hexagon opening.

As is further evident from FIG. 4, protrusions 19 can be arranged on the side 16 of the bearing portion 14 facing in the direction of the areal structure 100, which for example can be formed conically and which in the assembled state of the device 1 are pressed into the areal structure 100. Through the protrusions 19, the connecting element 2 is additionally positively fixed relative to the areal structure 100.

Figure 5:
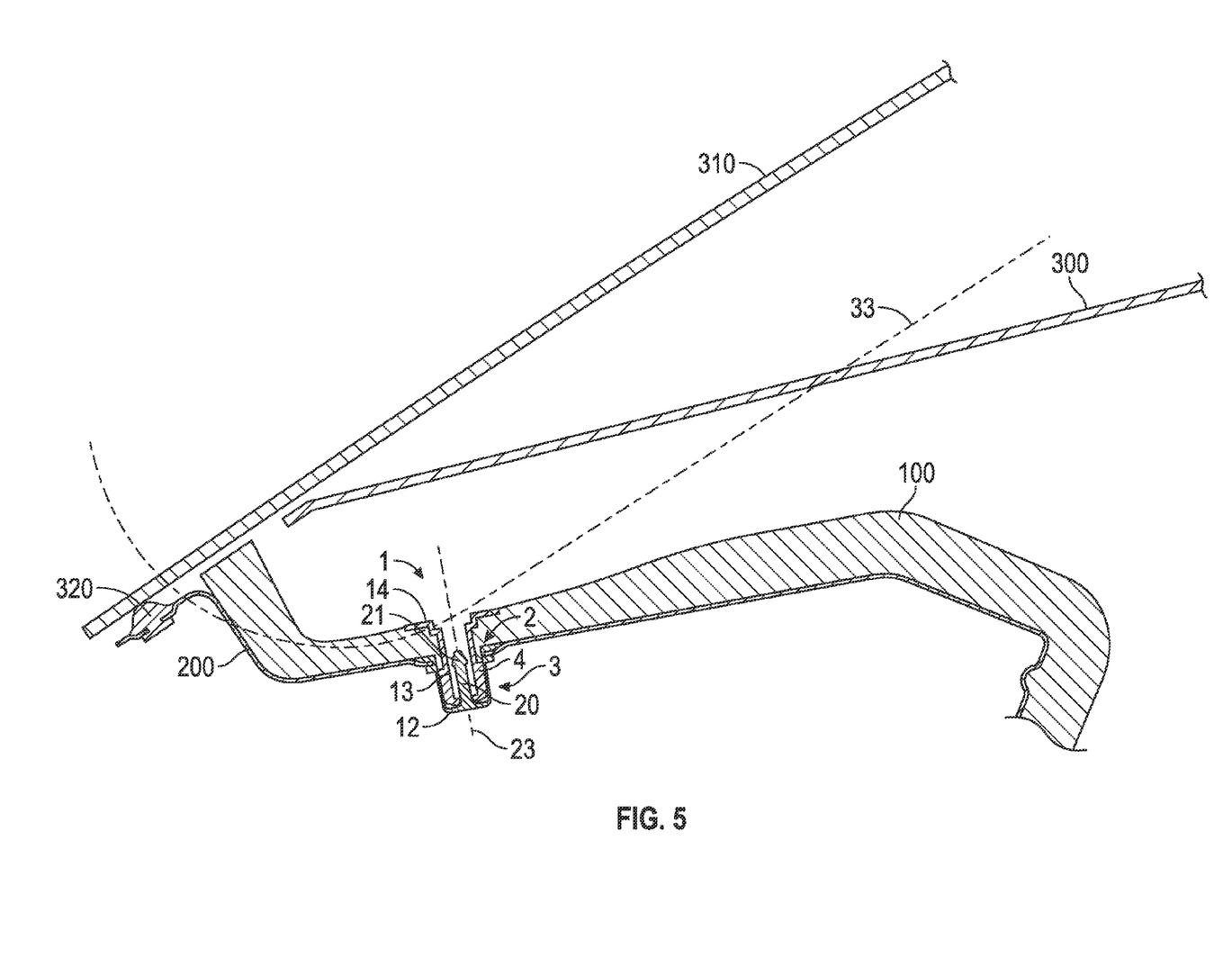
FIG. 5 is a sectional perspective view of the window support with the front wall insulation fixed thereon by the device according to FIG. 1, wherein the front wall insulation is in a compressed state and the device has shifted corresponding to the compression of the front wall insulation.

FIG. 5 shows the arrangement of areal structure 100, body part 200 and the device 1 according to FIG. 1, wherein in FIG. 5 the region is marked through a dash-dotted line 33, in which in the case of a collision of the vehicle with a pedestrian, cyclist or motor cyclist, the person can strike the window support 200. During such an impact, the areal structure 100, as shown in FIG. 5, would be compressed in the front region of the windshield 310 and the window support or the body part 200. In the case of such a compression of the areal structure 100, the device 1 with its connecting element 2 will move into the mounting 4 of the counterpart element 3 in axial direction such that the bearing portion 14 remains in the state bearing against the top of the areal structure 100 despite the compression of the areal structure 100. Thus, a protrusion of the connecting element 2 relative to the compressed areal structure 100 is prevented.

As is further evident from FIG. 5, the bottom 12 and the bulge 21 form limitation means, through which the movement of the connecting element 2 in the mounting 4 of the counterpart element 3 is limited. The positive connection means 22 and material portions 24 in this case move in axial direction along the free-standing material portion 20 of the counterpart element 3 until they come to bear against the bottom 12. In the opposite direction, the material portions 24 can be moved back along the free-standing material portion 20 in the mounting 4 so far until the material portions 24 enter into the state bearing against the bulge 21 of the counterpart element 3.

Figure 6:
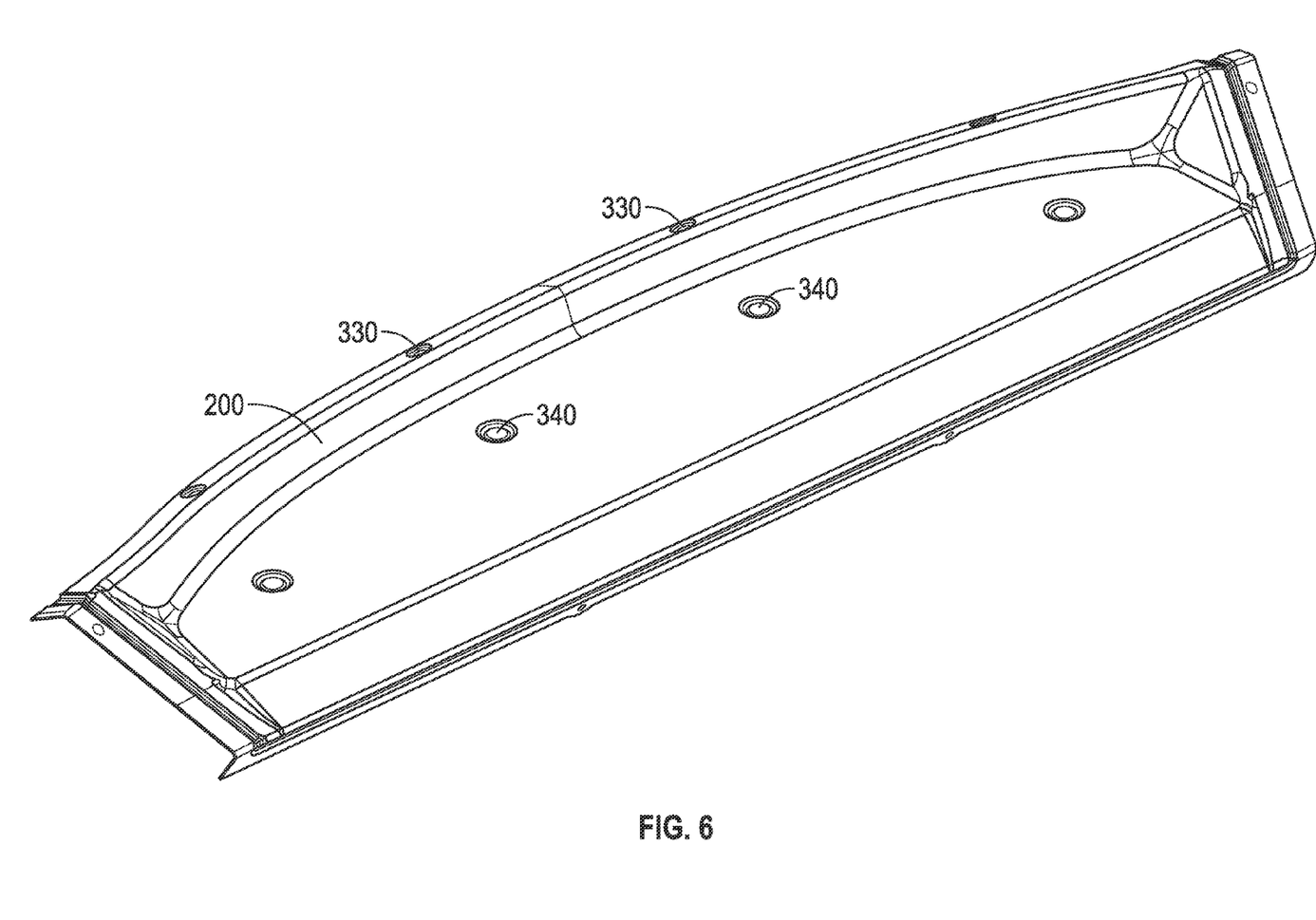
FIG. 6 is a perspective view of the window support according to FIG. 1 with a plurality of openings each for receiving a component of the device.

FIG. 6 shows the body part 200 formed as window support in perspective representation. As is evident from this, the body part 200 has a plurality of through-openings 340, on which a counterpart element 3 of each of the device 1 can be fastened. Furthermore, the body part 200 has a plurality of through-openings 330, on each of which a spacer piece 320 can be fastened, as is for example already evident from FIG. 1.

Figure 7:
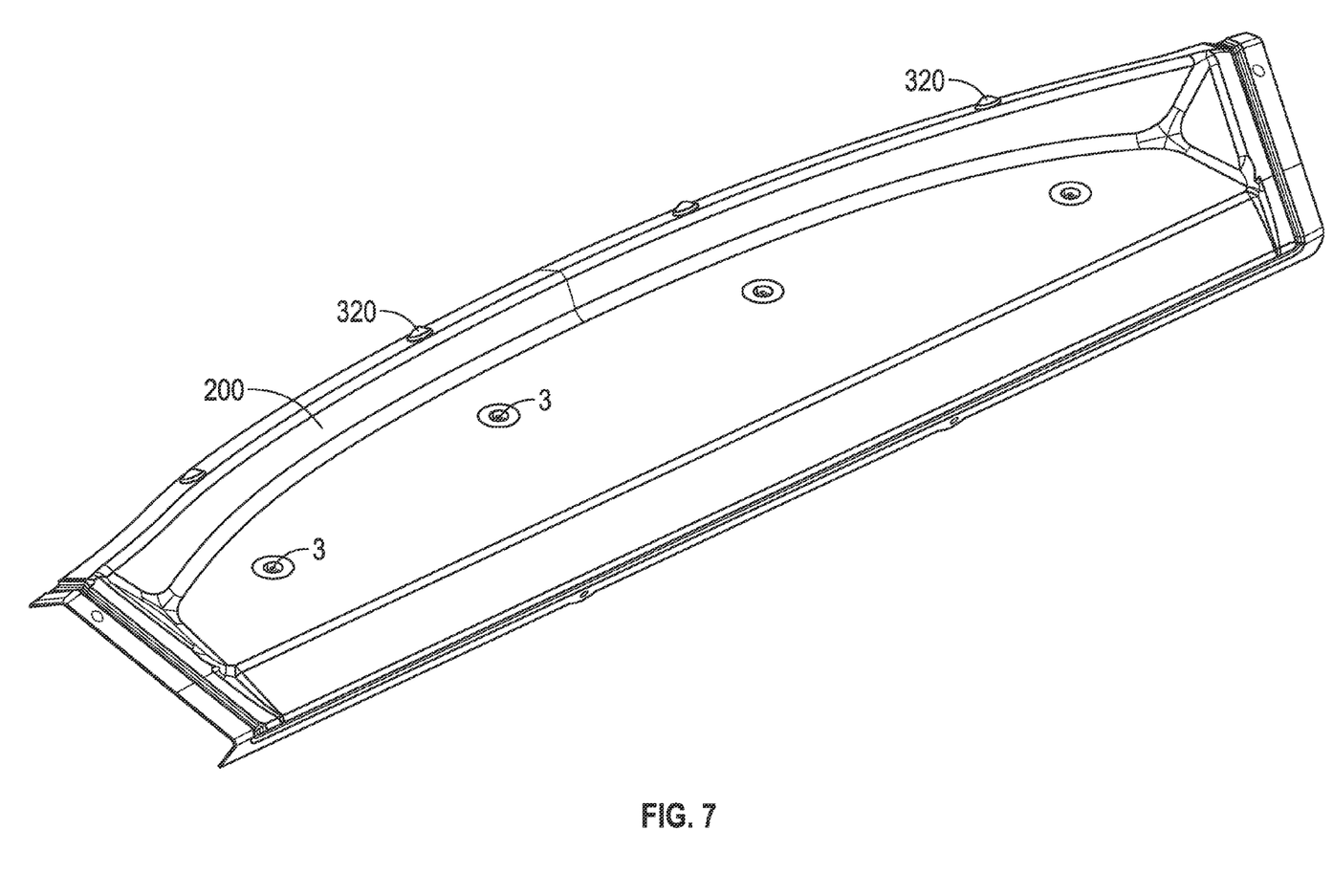
FIG. 7 is a perspective view of the window support according to FIG. 6, wherein a component each of the device is mounted in the openings.

FIG. 7 shows the body part 200 according to FIG. 6, wherein in the FIG. 7 a spacer piece 320 each is assembled in the associated through-opening 330. In addition to this, a counterpart element 3 of the device 1 is installed in each of the through-openings 340 of the body part 200.

The finished body part 200 is preferably a panel part, which is coated with plastic, in particular enveloped with plastic.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

LIST OF REFERENCE NUMBERS

1 Device
2 Connecting element
3 Counterpart element
4 Mounting
5 Thickness direction
6 Insertion direction
10 Hollow space
11 Basic body
12 Bottom
13 Insertion portion
14 Bearing portion
15 Outside
16 Inside
17 Opening
18 Tool
19 Protrusion
20 Material portion
21 Bulge
22 Positive connection means
23 Longitudinal axis
24 Material portion
25 Intermediate space
27 Depression
28 Rim
29 Protrusion
30 Holder
31 Through-opening
32 Lead-in slope
33 Dash-dotted line
34 Outer surface
100 Areal structure
200 Body part
300 Instrument panel
310 Windshield
320 Spacer piece
330 Through-opening
340 Through-opening

The invention claimed is:

1. A device for fastening a compressible areal structure to a body part of a vehicle, the device comprising:
a connecting element, and
a counterpart element that is connected to the connecting element when the compressible areal structure is fastened to the body part, wherein the counterpart element comprises a mounting into which the connecting element is insertable to couple the connecting element to the counterpart element and the mounting is defined through a substantially cylindrical hollow space of a basic body, which is at least partially closed off with a bottom at one end, wherein the mounting allows a movement of the connecting element relative to the counterpart element while maintaining the fixing of compressible areal structure and body part, wherein the basic body comprises an oblong material portion originating from the bottom, which oblong material portion projects into the substantially cylindrical hollow space and on its free end comprises a bulge that serves as an abutment for positive connection means of the connecting element.

2. The device according to claim 1, wherein the mounting in a direction that extends substantially orthogonal to a plane formed by a surface of the compressible areal structure allows a movement of the connecting element relative to the counterpart element while maintaining the fixing of compressible areal structure and body part.

3. The device according to claim 1, wherein the mounting in an insertion direction of the connecting element in the mounting allows a movement of the connecting element relative to the counterpart element while maintaining the fixing of compressible areal structure and body part.

4. The device according to claim 1, further comprising limitation means that limit the movement of the connecting element in the mounting.

5. The device according to claim 1, further comprising securing means that secure the connecting element and the counterpart element in a state connected to each other.

6. The device according to claim 1, wherein in a state of the connecting element and the counterpart element connected to each other the positive connection means of the connecting element at least partially engage about the oblong material portion so that the positive connection means are movably held relative to the oblong material portion in a direction of its longitudinal axis in order to allow a movement of the connecting element relative to the counterpart element.

7. The device according to claim 1, wherein the oblong material portion with its longitudinal axis lies in a center of the substantially cylindrical hollow space.

8. The device according to claim 1, wherein, as seen in a circumferential direction of the oblong material portion, the bulge is interrupted in at least two intermediate spaces, into which the positive connection means of the connecting element can be inserted, so that by twisting the connecting element relative to the counterpart element the positive connection means and the bulge engage in each other in an axial direction.

9. The device according to claim 1, wherein the positive connection means are defined through at least two material portions of the connecting element.

10. The device according to claim 9, wherein the at least two material portions are spring-elastic material portions.

11. The device according to claim 9, wherein the at least two material portions are formed on the front end of a hollow-cylindrical insertion portion of the connecting element.

12. The device according to claim 1, further comprising an anti-rotation device that prevents relative rotation between the connecting element and the counterpart element.

13. An arrangement comprising:
a body part;
a compressible areal structure, and
a device that fastens the compressible areal structure to the body part, the device comprising:
a connecting element, and
a counterpart element that is connected to the connecting element when the compressible areal structure is fastened to the body part, wherein the counterpart element comprises a mounting into which the connecting element is insertable to couple the connecting element to the counterpart element, and wherein the mounting allows a movement of the connecting element relative to the counterpart element while maintaining the fixing of areal structure and body part, wherein the connecting element of the device engaging through the compressible areal structure is connected to the counterpart element of the device, wherein the counterpart element is fastened to the body part and the mounting of the counterpart element projects outwardly away from the body part.

14. The arrangement according to claim 13, wherein the body part is a window support and the compressible areal structure is a sound and/or heat-insulation structure.

15. The arrangement according to claim 14, wherein the body part is a support for a windshield of a vehicle.

* * * * *